US011579022B2

(12) United States Patent
Narayanasamy et al.

(10) Patent No.: US 11,579,022 B2
(45) Date of Patent: Feb. 14, 2023

(54) DATA TRANSFER THROUGH AN ISOLATED POWER SUPPLY

(71) Applicant: Texas Instruments Incorporated, Dallas, TX (US)

(72) Inventors: Navaneeth Kumar Narayanasamy, Coimbatore (IN); Martin Staebler, Freising (GE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 247 days.

(21) Appl. No.: 17/015,277

(22) Filed: Sep. 9, 2020

(65) Prior Publication Data

US 2022/0074794 A1 Mar. 10, 2022

(51) Int. Cl.
| | | |
|---|---|---|
| *G01K 1/14* | (2021.01) | |
| *G01K 7/00* | (2006.01) | |
| *H02P 29/60* | (2016.01) | |
| *H02P 29/64* | (2016.01) | |
| *H02P 29/68* | (2016.01) | |
| *H02P 27/06* | (2006.01) | |

(52) U.S. Cl.
CPC .............. *G01K 1/14* (2013.01); *G01K 7/00* (2013.01); *H02P 29/60* (2016.02); *H02P 29/64* (2016.02); *H02P 29/68* (2016.02); *G01K 2215/00* (2013.01); *H02P 27/06* (2013.01)

(58) Field of Classification Search
CPC ........ G01K 1/14; G01K 7/00; G01K 2215/00; H02P 29/60; H02P 29/64; H02P 29/68; H02P 27/06
USPC ........................... 318/803, 802, 798; 361/25
See application file for complete search history.

(56) References Cited

U.S. PATENT DOCUMENTS

| | | | | | |
|---|---|---|---|---|---|
| 4,414,499 | A | * | 11/1983 | Hedges | ................... H02P 23/26 318/729 |
| 5,814,966 | A | * | 9/1998 | Williamson | ............ H02P 27/02 318/812 |
| 6,434,505 | B1 | * | 8/2002 | Koepke | ................... H02H 6/005 374/E7.042 |
| 10,230,323 | B2 | * | 3/2019 | Suzuki | .................... H02P 29/60 |

* cited by examiner

*Primary Examiner* — David Luo
(74) *Attorney, Agent, or Firm* — John R. Pessetto; Frank D. Cimino (57) ABSTRACT

In described examples, a measurement circuit includes an isolated power supply that generates an output signal in response to an input signal. A signal processing circuit is coupled to the isolated power supply and generates a first signal in response to a sense signal. A load manipulator circuit is coupled to the signal processing circuit and the isolated power supply. The load manipulator circuit receives the first signal. A detect circuit is coupled to the isolated power supply and generates a second signal in response to the input signal.

21 Claims, 4 Drawing Sheets

DATA TRANSFER THROUGH AN ISOLATED POWER SUPPLY

TECHNICAL FIELD

This description relates generally to temperature measurement, and more particularly to a method and an apparatus for measuring temperature through an isolated power supply.

BACKGROUND

An electric motor finds application in multiple industrial devices such as blowers, fans, machine tools, pumps, compressors, ships, power tools and the like. The electric motors are also used in hybrid and electric vehicles. A motor converts an electric energy into mechanical energy. A part of this electric energy is converted to heat energy during the process which tends to increase temperature of the motor windings. Generally, one or more temperature sensors are embedded in stator windings of the motor to detect high motor temperatures and to prevent overheating of the motor windings.

A measurement circuit is used to interface a processor and the temperature sensors in the motor windings. The measurement circuit processes the signals from one or more sensors in the motor windings and provides the processed signals to the processor. The measurement circuit needs to be isolated due to safety reasons as the motor windings operate at a high voltage. An isolated power supply in the measurement circuit is used to provide power to the temperature sensors and to multiple components in the measurement circuit. The currently used measurement circuits are expensive and increase the cost of the system. In addition, the existing measurement circuits are prone to failure which potentially reduces reliability of the system. A failure of the measurement circuit may damage the motor when the windings of the motor get heated to a very high temperature or the temperature of the windings is outside an acceptable range.

SUMMARY

In described examples, a measurement circuit includes an isolated power supply that generates an output signal in response to an input signal. A signal processing circuit is coupled to the isolated power supply and generates a first signal in response to a sense signal. A load manipulator circuit is coupled to the signal processing circuit and the isolated power supply. The load manipulator circuit receives the first signal. A detect circuit is coupled to the isolated power supply and generates a second signal in response to the input signal.

DETAILED DESCRIPTION OF EXAMPLE EMBODIMENTS

Figure 1:
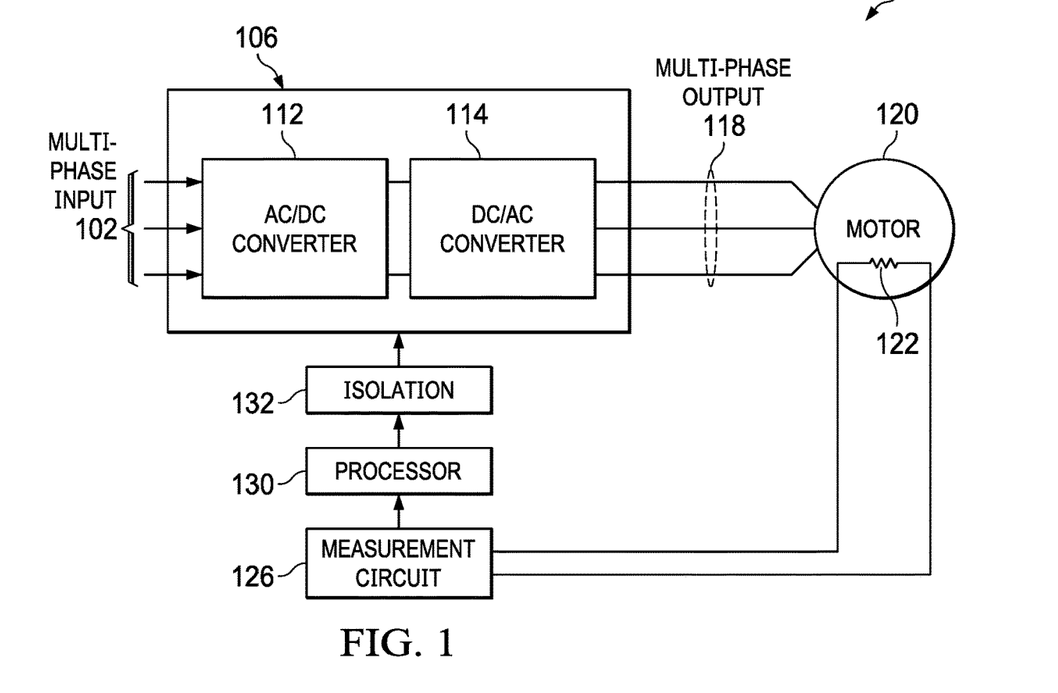
FIG. 1 is a block diagram of an example system in which several aspects of example embodiments can be implemented.

FIG. 1 is a block diagram of an example system 100 in which several aspects of example embodiments can be implemented. The system 100 includes an inverter 106, a motor 120, a measurement circuit 126 and a processor 130. The inverter 106 includes an AC to DC converter 112 and a DC to AC converter 114. In one example, the DC to AC converter 114 is a DC to DC converter. In another example, the DC to AC converter 114 is a power stage including switching or linear type based on the type of the motor 120 used in the system 100. A sensor 122 is embedded inside the motor 120. In one example, the sensor 122 is a temperature sensor embedded in stator windings of the motor 120. The motor 120 can be any motor such as an induction motor, a BLDC (brushless DC) motor, a PMSM (permanent-magnet synchronous motor) or any other type of motor. In one example, 120 is a load driven by the inverter 106.

The motor 120 is coupled to the inverter 106. The measurement circuit 126 is coupled to the sensor 122 in the motor 120. The processor 130 is coupled to the measurement circuit 126. The processor 130 is also coupled to the inverter 106 through isolation 132. The system 100 may include one or more conventional components that are not described herein for simplicity of the description.

The inverter 106 receives a multi-phase input 102 and generates a multi-phase output 118. The inverter 106 performs dual power conversion. Firstly, the multi-phase input 102 is converted from AC to DC in the AC to DC converter 112. Thereafter, the DC to AC converter 114 converts the DC to AC to generate the multi-phase output 118. The DC to AC converter 114 may include multiple gate drivers and power switching devices such as MOSFET and IGBT. The processor 130 generates multiple PWM (pulse width modulated) signals based on a control algorithm. The PWM signals are provided through the isolation 132 to multiple gate drivers in the DC to AC converter 114. The multiple gate drivers level shift the PWM signals and provide the level shifted PWM signals to the power switching devices. The multiple gate drivers are also used to activate or inactivate one or more power switching devices. Based on a mode of operation of the motor 120, the processor 130 modulates a voltage level and a frequency level of the multi-phase output 118. In one example, the multi-phase output 118 generated by the inverter 106 is a power signal or a drive signal.

The measurement circuit 126 receives a sense signal from the sensor 122. The measurement circuit 126 may amplify, compare and perform analog to digital conversion of this sense signal to generate a digital signal. In one example, the measurement circuit 126 generates an analog signal. The measurement circuit 126 provides the digital signal or the analog signal to the processor 130. The processor 130 is isolated from the measurement circuit 126 as the motor 120 operate at high voltages. When the sensor 122 is a temperature sensor and indicates that the temperature of the motor 120 is beyond a specified limit, the processor 130 accordingly modifies the multi-phase output 118. The processor 130, in one example, provides control signals to the inverter 106. The multi-phase output 118 or the drive signal generated by the inverter 106 is controlled based at least partially on the control signals generated by the processor 130. In some cases, the processor 130 inactivates the inverter 106 to completely halt the operation of the motor 120.

Figure 2:
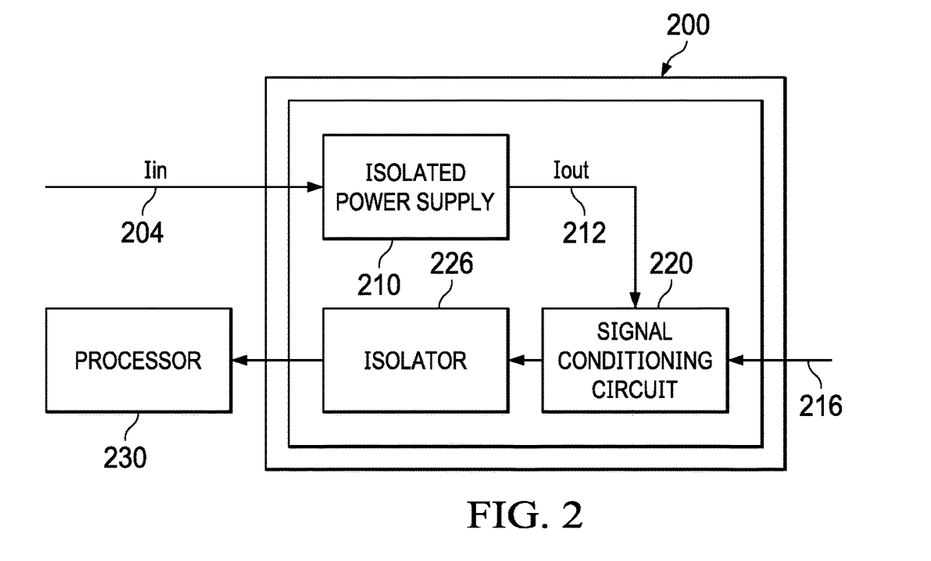
FIG. 2 is a block diagram of a measurement circuit.

FIG. 2 is a block diagram of a measurement circuit 200. The measurement circuit 200 is similar, in connection, to the measurement circuit 126 shown in FIG. 1. The measurement circuit 200 includes an isolated power supply 210, a signal conditioning circuit 220 and an isolator 226. A processor 230 is coupled to the measurement circuit 200. The processor 230 is similar, in connection and operation, to the processor 130 in FIG. 1. The isolated power supply 210 generates an output signal Iout 212 in response to an input signal Iin 204.

The signal conditioning circuit 220 is powered by the output signal Iout 212. The signal conditioning circuit 220 receives a sense signal 216. Similar to system 100 of FIG. 1, the sense signal 216 is received from a motor. The isolator 226 is used to isolate the signal conditioning circuit 220 and the processor 230 as the motor operates at very high voltages. The isolator 226 is coupled to the signal conditioning circuit 220. The processor 230 is coupled to the isolator 226.

Example of the isolator 226 includes, or is included as part of or a combination of, amplifier, modulator, voltage to frequency converter, opto-coupler and voltage to PWM converter. The signal conditioning circuit 220 may amplify, compare and perform analog to digital conversion of the sense signal 216 to generate a digital signal. In one version, the signal conditioning circuit 220 compares the sense signal 216 to a reference threshold to generate the digital signal. This digital signal is provided to the processor 230 through the isolator 226. When the isolator is an isolated amplifier or an isolated modulator or a digital isolator combined with a conversion circuit, the digital signal is provided to the processor 230 through an isolation barrier which is either inbuilt in the isolator 226 or built externally using an opto-coupler.

The use of isolator 226 in the measurement circuit 200 is disadvantageous since the isolator 226 is expensive. Also, when the isolator 226 is used in a system similar to system 100, it increases the area of the system which is undesirable. In addition, the isolator 226 degrades the reliability of the measurement circuit 200. When the measurement circuit is used in a system like system 100 illustrated in FIG. 1, and when the windings of the motor get heated to a very high temperature or the temperature of the motor windings is outside an acceptable range, a failure of the isolator 226 may damage the motor as the processor 230 would not receive the high temperature information from the measurement circuit 200

Figure 3:
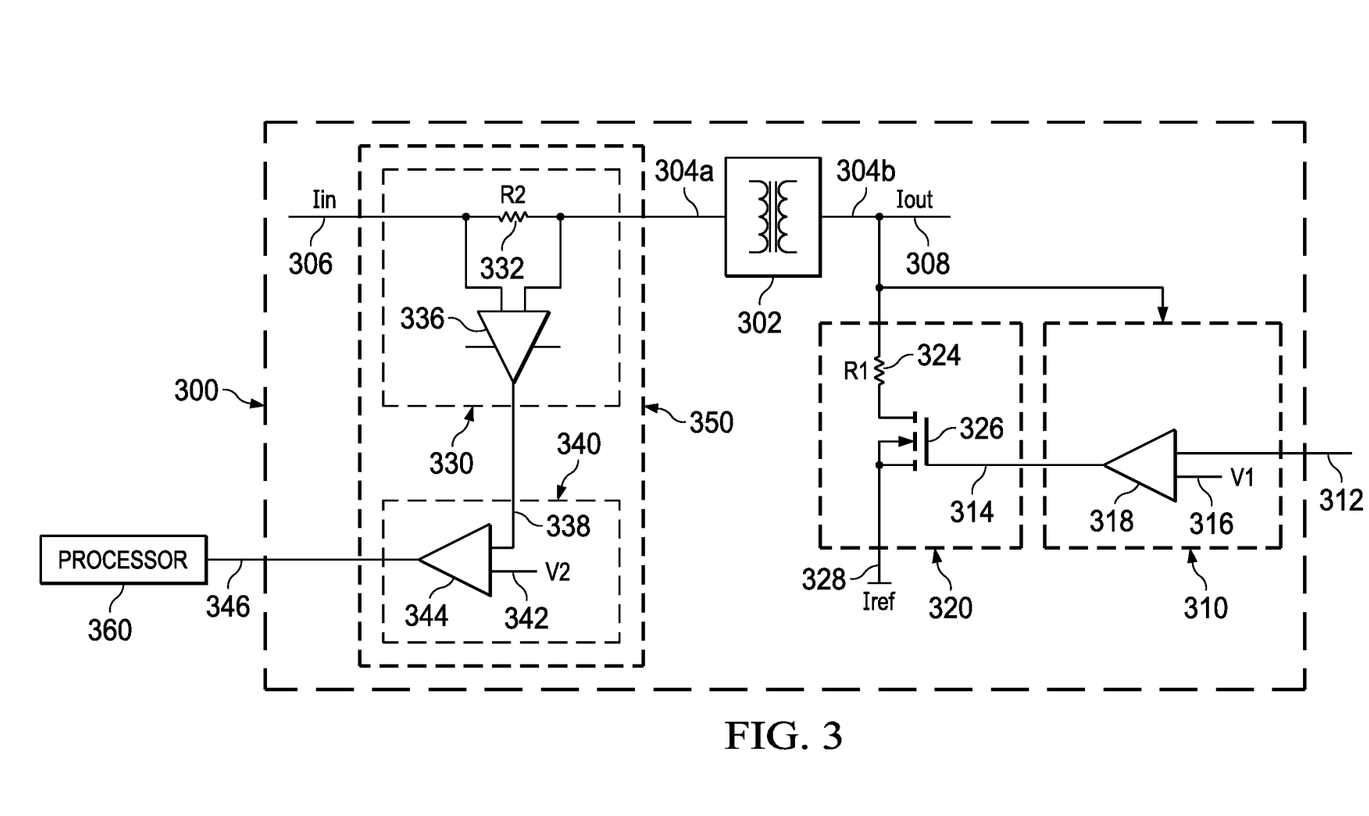
FIG. 3 illustrates a measurement circuit, according to an embodiment.

FIG. 3 illustrates a measurement circuit 300, according to an embodiment. The measurement circuit 300 is similar, in connection, to the measurement circuit 126 shown in FIG. 1. The measurement circuit 300 includes an isolated power supply 302, a signal processing circuit 310, a load manipulator circuit 320 and a detect circuit 350.

The isolated power supply 302 includes one of open loop or closed loop control. The topology of the isolated power supply 302 is one of push-pull, fly back, fly buck or any other conventional topology. The isolated power supply 302 also includes a transformer or coupled inductors of desired ratings to meet the isolation specification. The signal processing circuit 310 is coupled to the isolated power supply 302. The signal processing circuit 310 includes a first comparator 318. The load manipulator circuit 320 is coupled to the isolated power supply 302 and the signal processing circuit 310. The load manipulator circuit 320, in one example, includes a transistor 326 and a first resistor R1 324. The load manipulator circuit 320, in another example, is an electronic switch. The first resistor R1 324 can be of fixed value or of programmable value. The first resistor R1 324 can be a single or multi component. In one example, the first resistor R1 324 is an electronic potentiometer. In another example, the first resistor R1 324 is a transistor operating in a linear range. A gate terminal of the transistor 326 is coupled to the signal processing circuit 310 and a drain terminal of the transistor 326 is coupled to the isolated power supply 302. A source terminal of the transistor 326 is coupled to a secondary reference source Iref 328.

The detect circuit 350 is coupled to the isolated power supply 302. The detect circuit 350 includes a sense circuit 330 and a decoder 340. The sense circuit 330 is coupled to the isolated power supply 302. The sense circuit 330 includes a shunt resistor R2 332 and a gain stage 336. The gain stage 336 is coupled in parallel to the shunt resistor R2 332. The decoder 340 is coupled to the sense circuit 330. The decoder 340 includes a second comparator 344. The detect circuit 350 is coupled to a processor 360. Each block or component of FIG. 3 may include, or coupled to, one or more conventional components which are not shown in FIG. 3 for simplicity.

In operation of the measurement circuit 300, the isolated power supply 302 generates an output signal Iout 308 responsive to an input signal Iin 306. In one example, the output signal Iout 308 and the input signal Iin 306 are current signals. In another example, the output signal Iout 308 and the input signal Iin 306 are voltage signals. The isolated power supply 302 includes a low voltage side 304a and a high voltage side 304b. The input signal Iin 306 is received on the low voltage side 304a and the output signal Iout 308 is generated on the high voltage side 304b.

The signal processing circuit 310 is powered by the output signal Iout 308 from the isolated power supply 302. The signal processing circuit 310 receives a sense signal 312. In one example, the sense signal 312 is received from a motor, similar to system 100 of FIG. 1. In another example, the sense signal 312 is a temperature signal received from a temperature sensor embedded in motor stator windings. The temperature sensor is coupled to the high voltage side 304b of the isolated power supply 302 and is powered by the output signal Iout 308. The first comparator 318 in the signal processing circuit 310 compares the sense signal 312 and a first reference voltage V1 316 to generate a first signal 314.

The signal processing circuit 310 generates the first signal 314 when the sense signal 312 is greater than the first reference voltage V1 316. In one example, the signal processing circuit 310 is a voltage to PWM (pulse width modulated) converter. The signal processing circuit 310 generates output pulses whose duty cycle is varied based on the sense signal 312. In another example, the signal processing circuit 310 is a voltage to frequency converter. The signal processing circuit 310 generates output pulses whose frequency is varied based on the sense signal 312. The secondary reference source Iref 328, in one version, is related to the output signal Iout 308. In yet another example, the signal processing circuit 310 is a circuit that generates the first signal 314 responsive to the sense signal 312.

The gate terminal of the transistor 326 in the load manipulator circuit 320 receives the first signal 314 from the first comparator 318. The transistor 326 is activated (turned-on) on receiving the first signal 314. The load manipulator circuit 320 draws an additional current from the isolated power supply 302 when the transistor 326 is activated by the first signal 314. This result in an increase in the output signal Iout 308, when the output signal Iout 308 and the input signal Iin 306 are current signals. The input signal Iin 306 increases to support the increase in the output signal Iout 308. In one version, the load manipulator circuit 320 is a circuit with multiple transistors that draw the additional current from the isolated power supply 302 when activated by the first signal 314. In yet another example, the load manipulator circuit 320 is a circuit that results in modification of the output signal Iout 308 when activated by the first signal 314.

The shunt resistor R2 332 in the sense circuit 330 receives the input signal Iin 306. A voltage generated across the shunt resistor R2 332 is received by the gain stage 336 and the gain stage 336 generates a primary signal 338 in response to the voltage generated across the shunt resistor R2 332. The second comparator 344 in the decoder 340 compares the primary signal 338 and a second reference voltage V2 342 to generate a second signal 346. When an increased input signal Iin 306 is drawn by the isolated power supply 302, the primary signal 338 is more than the second reference voltage V2 342 resulting in the second signal 346 being generated by the decoder 340. The second signal 346 is provided to the processor 360. In one example, the detect circuit 350 is a circuit that generates the second signal 346 when there is a change in the input signal Iin 306. The processor 360 based on the second signal 346 modulates the multi-phase output generated by the DC to AC converter 114 illustrated in FIG. 1. The second signal 346, in one version, is a logic high and logic low signal. In another version, the second signal 346 is a digital output with frequency or pulse width modulation.

Thus, the measurement circuit 300 enables the processor 360 to control the multi-phase output provided to the motor 120 (illustrated in FIG. 1). When the temperature sensor embedded in the motor stator windings indicate that the temperature of the motor is beyond a specified limit, the first signal 314 generated by the signal processing circuit 310 activates the transistor 326 in the load manipulator circuit 320. The load manipulator circuit 320 draws an additional current from the isolated power supply 302. This result in an increase in the output signal Iout 308, when the output signal Iout 308 and the input signal Iin 306 are current signals. The input signal Iin 306 increases to support the increase in the output signal Iout 308. An increase in the input signal Iin 306 results in the detect circuit 350 to generate the second signal. Based on the second signal, the processor 360 controls the multi-phase output provided to the motor 120 (illustrated in FIG. 1) to bring the temperature of the motor 120 below the specified limit. In one example, the processor 360 completely halts the operation of the motor when the temperature of the motor exceeds a permissible limit.

Thus, the measurement circuit 300 is able to detect changes in motor parameters without the use of expensive isolators. Also, the measurement circuit 300 is more reliable than the measurement circuit 200 since it passes the information from the high voltage side 304b to the low voltage side 304a without the use of any physical device or isolation device. Also, the measurement circuit 300 does not increase the board area as in the case of measurement circuit 200. The measurement circuit 300 can find application in any field which requires measurement of system parameters across an isolated power supply. The measurement circuit 300 can be used for measurement of parameters such as temperature, vibration, capacitance and pressure. The measurement circuit 300 finds application in industrial motor drives and factory automation.

Figure 4:
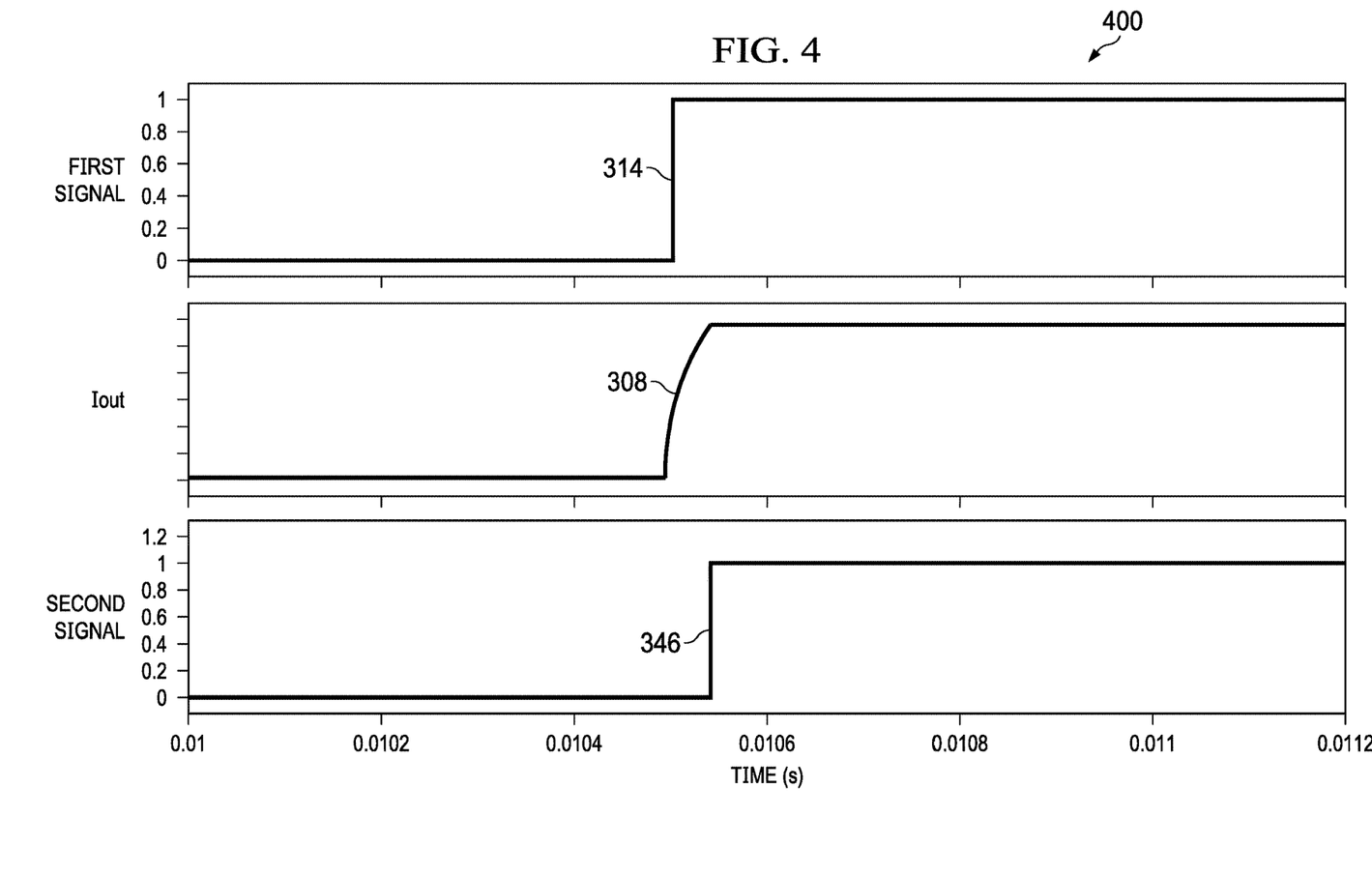
FIG. 4 is a timing diagram of operation of the measurement circuit 300 in FIG. 3, according to an embodiment.

FIG. 4 is a timing diagram 400 of operation of the measurement circuit 300 in FIG. 3, according to an embodiment. The timing diagram 400 is described in connection with the operation of the measurement circuit 300 of FIG. 3. The signal processing circuit 310 generates the first signal 314 when the sense signal 312 is greater than the first reference voltage V1 316. When the temperature sensor embedded in the motor stator windings indicate that the temperature of the motor is beyond a specified limit, the first signal 314 is generated by the signal processing circuit 310.

As illustrated in the timing diagram 400, when the first signal 314 is generated or moves to logic high state, an increase in the output signal Iout 308 is observed, when the output signal Iout 308 and the input signal Iin 306 are current signals. This is because the transistor 326 in the load manipulator circuit 320 is activated (turned-on) on receiving the first signal 314. The load manipulator circuit 320 draws an additional current from the isolated power supply 302 when the transistor 326 is activated by the first signal 314. This result in an increase in the output signal Iout 308. The input signal Iin 306 increases to support the increase in the output signal Iout 308.

As illustrated in the timing diagram 400, the second signal 346 is generated when the output signal Iout 308 increases. The input signal Iin 306 increases to support the increase in the output signal Iout 308. The second signal 346 is generated by the detect circuit 350 when the input signal Iin 306 changes. The detect circuit 350 includes the sense circuit 330 and the decoder 340. The shunt resistor R2 332 in the sense circuit 330 receives the input signal Iin 306. A voltage generated across the shunt resistor R2 332 is received by the gain stage 336 and the gain stage 336 generates the primary signal 338 in response to the voltage generated across the shunt resistor R2 332. The second comparator 344 in the decoder 340 compares the primary signal 338 and the second reference voltage V2 342 to generate the second signal 346.

Based on the second signal, the processor 360 controls the multi-phase output provided to the motor 120 (illustrated in FIG. 1) to bring the temperature of the motor below the specified limit. In one example, the processor 360 completely halts the operation of the motor when the temperature of the motor exceeds a permissible limit. Thus, the measurement circuit 300 is able to detect changes in motor parameters without the use of expensive isolators. Also, the measurement circuit 300 is more reliable than the measurement circuit 200 since it passes the information from the high voltage side 304b to the low voltage side 304a without the use of any physical device or isolation device. Also, the measurement circuit 300 does not increase the board area as in the case of measurement circuit 200. The measurement circuit 300 can find application in any field which requires measurement of system parameters across an isolated power supply.

Figure 5:
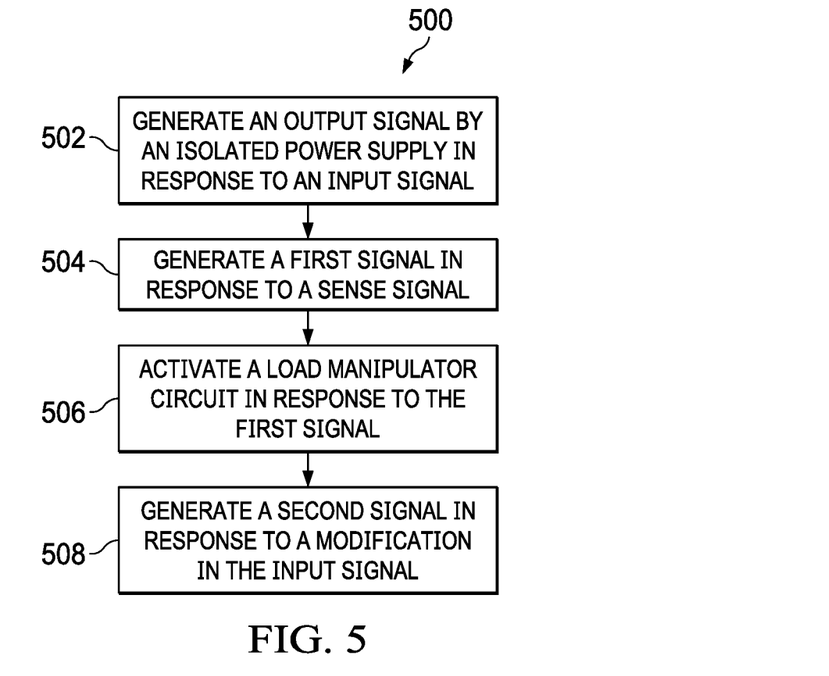
FIG. 5 is a flowchart of a method of operation of a measurement circuit, according to an embodiment.

FIG. 5 is a flowchart 500 of a method of operation of a measurement circuit, according to an embodiment. The flowchart 500 is described in connection with the measurement circuit 300 of FIG. 3. At step 502, an output signal is generated by an isolated power supply in response to an input signal. In the measurement circuit 300, the isolated power supply 302 generates an output signal Iout 308 responsive to an input signal Iin 306. The isolated power supply 302 includes a low voltage side 304a and a high voltage side 304b. The input signal Iin 306 is received on the low voltage side 304a and the output signal Iout 308 is generated on the high voltage side 304b.

At step 504, a first signal is generated in response to the sense signal. The signal processing circuit 310, in the measurement circuit 300, receives a sense signal 312. In one example, the sense signal 312 is received from a motor, similar to system 100 of FIG. 1. In another example, the sense signal 312 is a temperature signal received from a temperature sensor embedded in motor stator windings. The temperature sensor is coupled to the high voltage side 304b of the isolated power supply 302 and is powered by the output signal Iout 308. The first comparator 318 in the signal processing circuit 310 compares the sense signal 312 and a first reference voltage V1 316 to generate the first signal 314. The signal processing circuit 310 generates the first signal 314 when the sense signal 312 is greater than the first reference voltage V1 316.

At step 506, a load manipulator circuit is activated in response to the first signal. The transistor 326 in the load manipulator circuit 320 is activated (turned-on) on receiving the first signal 314. The load manipulator circuit 320 draws an additional current from the isolated power supply 302 when the transistor 326 is activated by the first signal 314. This further result in an increase in the output signal Iout 308. The input signal Iin 306 increases to support the increase in the output signal Iout 308.

At step 508, a second signal is generated in response to a modification in the input signal. The input signal Iin 306 increases to support the increase in the output signal Iout 308. The second signal 346 is generated by the detect circuit 350 when the input signal Iin 306 changes. The detect circuit 350 includes the sense circuit 330 and the decoder 340. The shunt resistor R2 332 in the sense circuit 330 receives the input signal Iin 306. A voltage generated across the shunt resistor R2 332 is received by the gain stage 336 and the gain stage 336 generates the primary signal 338 in response to the voltage generated across the shunt resistor R2 332. The second comparator 344 in the decoder 340 compares the primary signal 338 and the second reference voltage V2 342 to generate the second signal 346.

Based on the second signal, the processor 360 controls the multi-phase output provided to the motor 120 (illustrated in FIG. 1) to bring the temperature of the motor below the specified limit. In one example, the processor 360 completely halts the operation of the motor when the temperature of the motor exceeds a permissible limit. Thus, the method illustrated by flowchart 500 enables a device to detect changes in motor parameters without the use of expensive isolators. Also, the method is more reliable since it passes the information from the high voltage side of the isolated power supply to the low voltage side without the use of any physical device or isolation device. The method can find application in any field which requires measurement of system parameters across an isolated power supply.

Figure 6:
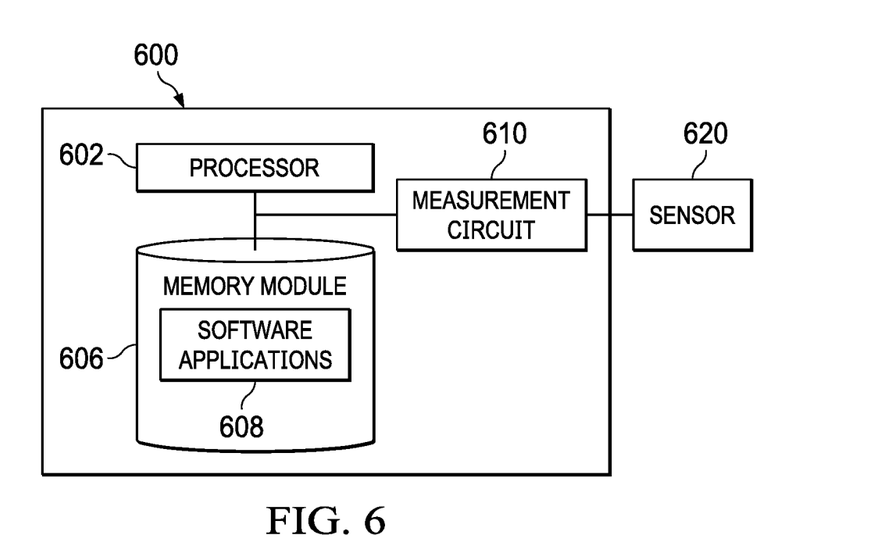
FIG. 6 is a block diagram of an example device in which several aspects of example embodiments can be implemented.

FIG. 6 is a block diagram of an example device 600 in which several aspects of example embodiments can be implemented. The device 600 is, or in incorporated into or is part of, a robot, a vehicle, an industrial drive, a rail, a fan, a blower, a pump, a drilling device, a communication device, a transceiver, a computing device, or any other type of electronic system. The device 600 may include one or more conventional components that are not described herein for simplicity of the description.

In one example, the device 600 includes a processor 602 and a memory module 606. The processor 602 can be a CISC-type (complex instruction set computer) CPU, RISC-type CPU (reduced instruction set computer), a digital signal processor (DSP), a processor, a CPLD (complex programmable logic device), or an FPGA (field programmable gate array).

The memory module 606 (which can be memory such as RAM, flash memory, or disk storage) stores one or more software applications 608 (e.g., embedded applications) that, when executed by the processor 602, performs any suitable function associated with the device 600.

The processor 602 usually comprises memory and logic, which store information frequently accessed from the memory module 606. The device 600 includes a measurement circuit 610. In one example, the processor 602 may be placed on the same PCB or board as the measurement circuit 610. In another example, the processor 602 is external to the device 600. The measurement circuit 610 is similar, in connection and operation, to the measurement circuit 300 of FIG. 3.

The measurement circuit 610 includes an isolated power supply, a signal processing circuit, a load manipulator circuit and a detect circuit. The signal processing circuit is coupled to the isolated power supply. The load manipulator circuit is coupled to the isolated power supply and the signal processing circuit. The detect circuit is coupled to the isolated power supply. The detect circuit includes a sense circuit and a decoder. The sense circuit is coupled to the isolated power supply. The decoder is coupled to the sense circuit.

The isolated power supply generates an output signal responsive to an input signal. The signal processing circuit is powered by the output signal from the isolated power supply. The signal processing circuit receives a sense signal from a sensor 620. In one example, the sensor 620 is a temperature sensor embedded in motor stator windings and the sense signal is a temperature signal received from the temperature sensor. The sensor 620 is powered by the output signal generated by the isolated power supply.

When the sensor 620 indicates that the temperature of the motor is beyond a specified limit, a first signal is generated by the signal processing circuit. The first signal activates the load manipulator circuit. The load manipulator circuit draws an additional current from the isolated power supply. This result in an increase in the output signal. The input signal increases to support the increase in the output signal. An increase in the input signal results in the detect circuit to generate the second signal. Based on the second signal, the processor 602 controls the multi-phase output provided to the motor to bring the temperature of the motor below the specified limit. In one example, the processor 602 completely halts the operation of the motor when the temperature of the motor exceeds a permissible limit.

Thus, the measurement circuit 610 is able to detect changes in motor parameters without the use of expensive isolators. Also, the measurement circuit 610 is more reliable than the measurement circuit 200 since it passes the information from the high voltage side to the low voltage side of the isolated power supply without the use of any physical device or isolation device. Also, the measurement circuit 610 does not increase the board area as in the case of measurement circuit 200. The measurement circuit 610 can find application in any field which requires measurement of system parameters across an isolated power supply. The measurement circuit 610 can be used for measurement of parameters such as temperature, vibration, capacitance and pressure. The measurement circuit 610 finds application in industrial motor drives and factory automation.

Modifications are possible in the described embodiments, and other embodiments are possible, within the scope of the claims.

What is claimed is:
1. A circuit comprising:
an isolated power supply configured to generate an output signal in response to an input signal;
a signal processing circuit coupled to the isolated power supply and configured to generate a first signal in response to a sense signal;

a load manipulator circuit coupled to the signal processing circuit and the isolated power supply and configured to receive the first signal; and a detect circuit coupled to the isolated power supply and configured to generate a second signal in response to the input signal.

2. The circuit of claim 1, wherein the sense signal is received from a temperature sensor.

3. The circuit of claim 2, wherein the temperature sensor is embedded in motor stator windings.

4. The circuit of claim 1, wherein the isolated power supply includes a low voltage side and a high voltage side, the input signal is received on the low voltage side and the output signal is generated on the high voltage side.

5. The circuit of claim 1, wherein the signal processing circuit further comprises a first comparator configured to compare the sense signal and a first reference voltage to generate the first signal, the signal processing circuit is powered by the output signal from the isolated power supply.

6. The circuit of claim 1, wherein the load manipulator circuit includes a transistor whose gate terminal is configured to receive the first signal and whose drain terminal is configured to receive the output signal, wherein a source terminal of the transistor is coupled to a secondary reference source.

7. The circuit of claim 1, wherein the detect circuit further comprises:
a sense circuit coupled to the isolated power supply and configured to generate a primary signal; and
a decoder coupled to the sense circuit and configured to generate the second signal in response to the primary signal and a second reference voltage.

8. The circuit of claim 7, wherein the sense circuit further comprises:
a shunt resistor configured to receive the input signal; and
a gain stage coupled parallel to the shunt resistor and configured to generate the primary signal.

9. The circuit of claim 7, wherein the decoder further comprises a second comparator configured to compare the primary signal and the second reference voltage to generate the second signal.

10. The circuit of claim 9, wherein:
the signal processing circuit generates the first signal when the sense signal is greater than the first reference voltage;
the transistor in the load manipulator circuit is activated on receiving the first signal, wherein an additional current is drawn by the transistor from the isolated power supply;
the sense circuit generates the primary signal; and
the decoder generates the second signal when the primary signal is greater than the second reference voltage.

11. The circuit of claim 1 is a measurement circuit, and wherein the second signal is provided to a processor.

12. A method comprising:
generating an output signal by an isolated power supply in response to an input signal;
generating a first signal in response to a sense signal;
activating a load manipulator circuit in response to the first signal; and
generating a second signal in response to a modification in the input signal.

13. The method of claim 12 further comprising receiving the sense signal from a temperature sensor embedded in a motor stator windings.

14. The method of claim 12 further comprises receiving the input signal on a low voltage side of the isolated power supply and generating the output signal on a high voltage side of the isolated power supply.

15. The method of claim 12 further comprising comparing the sense signal and a first reference voltage in a signal processing circuit to generate the first signal, the signal processing circuit is powered by the output signal.

16. The method of claim 12, wherein activating the load manipulator circuit further comprises activating a transistor in the load manipulator circuit whose gate terminal is configured to receive the first signal and whose drain terminal is configured to receive the output signal, wherein a source terminal of the transistor is coupled to a secondary reference source.

17. The method of claim 16 further comprising drawing an additional current by the load manipulator circuit from the isolated power supply when the transistor is activated, wherein the input signal is modified when the additional current is drawn by the load manipulator circuit.

18. The method of claim 17, wherein generating the second signal further comprises:
generating a primary signal in response to the modified input signal; and
comparing the primary signal and a second reference voltage.

19. The method of claim 12 further comprising providing the second signal to a processor.

20. A device comprising:
a processor;
a memory module coupled to the processor; and
a circuit coupled to the processor and the memory module, the circuit comprising:
an isolated power supply configured to generate an output signal in response to an input signal;
a signal processing circuit coupled to the isolated power supply and configured to generate a first signal in response to a sense signal;
a load manipulator circuit coupled to the signal processing circuit and the isolated power supply and configured to receive the first signal; and
a detect circuit coupled to the isolated power supply and configured to generate a second signal in response to the input signal.

21. A system comprising:
a load;
an inverter configured to provide a drive signal to the load;
a sensor coupled to the load and configured to generate a sense signal;
a circuit coupled to the sensor, the circuit comprising:
an isolated power supply configured to generate an output signal in response to an input signal;
a signal processing circuit coupled to the isolated power supply and configured to generate a first signal in response to the sense signal;
a load manipulator circuit coupled to the signal processing circuit and the isolated power supply and configured to receive the first signal; and
a detect circuit coupled to the isolated power supply and configured to generate a second signal in response to the input signal; and
a processor coupled to the circuit and configured to receive the second signal, the processor configured to provide control signals to the inverter, wherein the drive signal generated by the inverter is controlled based at least partially on the control signals.

* * * * *